United States Patent [19]

Gempe et al.

[11] Patent Number: 5,166,741
[45] Date of Patent: Nov. 24, 1992

[54] OPTOELECTRONIC SPEED/DIRECTION DETECTOR

[75] Inventors: Horst A. Gempe, Phoenix; William S. Cumberledge, Scottsdale; David L. Vowles, Phoenix, all of Ariz.

[73] Assignee: Motorola, Inc., Schaumburg, Ill.

[21] Appl. No.: 692,876

[22] Filed: Apr. 29, 1991

[51] Int. Cl.⁵ ................................................ G01P 3/36
[52] U.S. Cl. ...................................... 356/28; 324/175
[58] Field of Search .................. 356/28; 324/175, 173; 346/18

[56] References Cited

U.S. PATENT DOCUMENTS 3,819,268  6/1974  Johnson ................................ 356/28
3,885,873  5/1975  Andermo .............................. 356/28
4,875,769  10/1989  Linebarger ........................... 356/28

*Primary Examiner*—Mark Hellner
*Attorney, Agent, or Firm*—Eugene A. Parsons

[57] ABSTRACT

A detector for sensing speed/direction of movement of apparatus including a reticle with alternate transparent and opaque portions coupled to the apparatus and having a light source mounted on one side and two spaced apart light sensors on the other side, which sensors produce alternate output signals with movement of the reticle. The sensor output signals are differentially compared to produce a digital output signal with a constant duty cycle. A second pair of light sensors is utilized to produce quadrature digital signals.

13 Claims, 5 Drawing Sheets

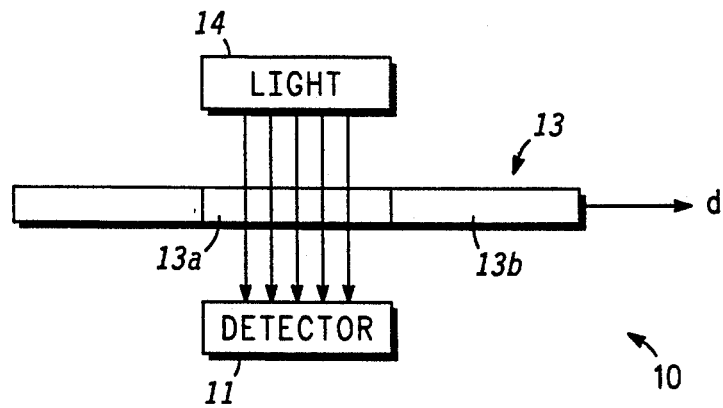
FIG. 1A
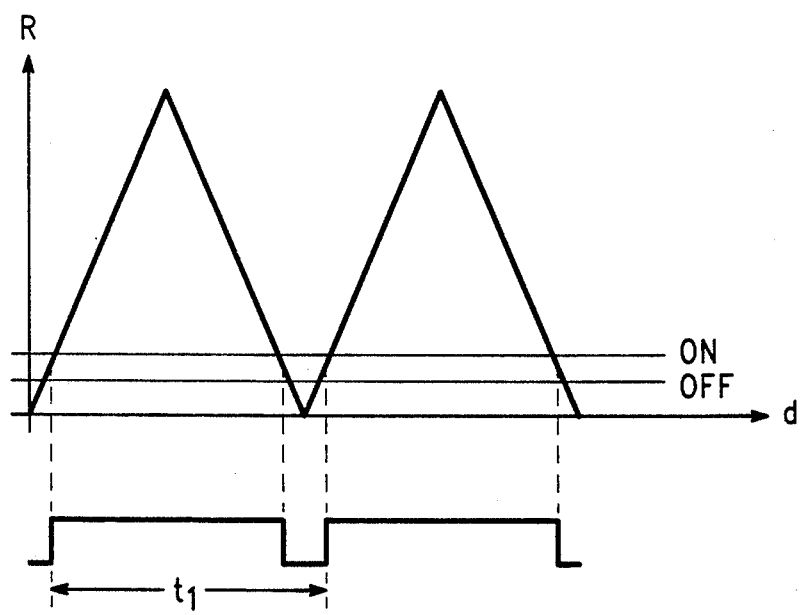
FIG. 1B —PRIOR ART—
FIG. 1C
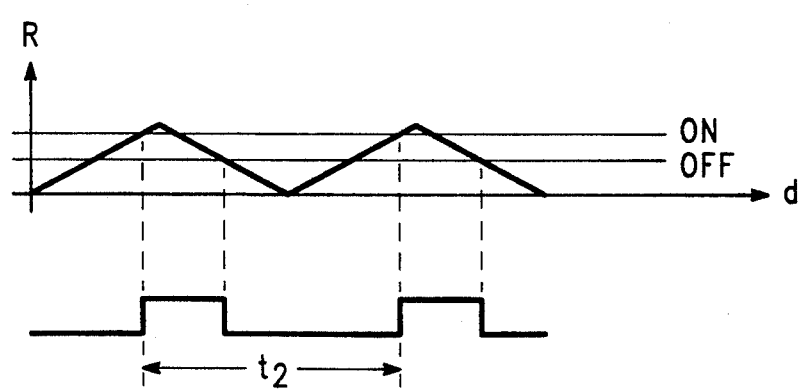
FIG. 1D
FIG. 1E

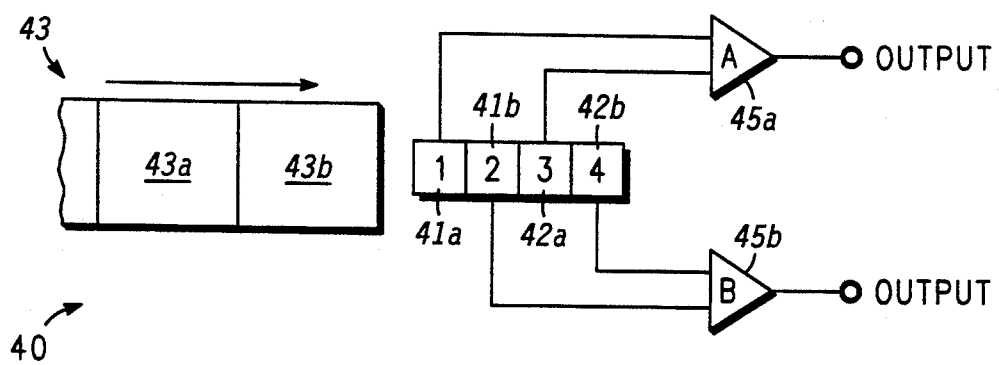
FIG. 5A
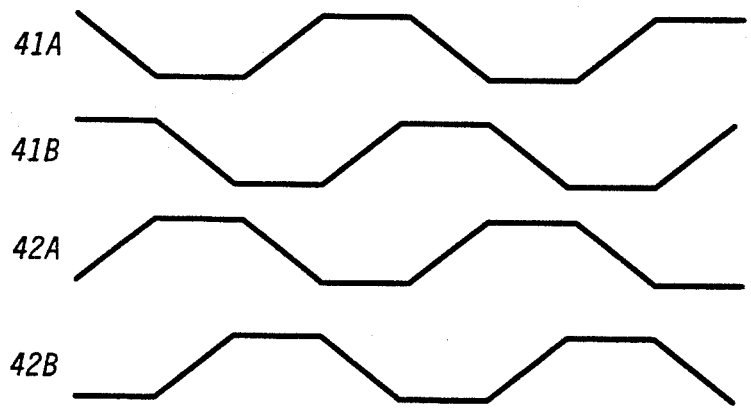
FIG. 5B
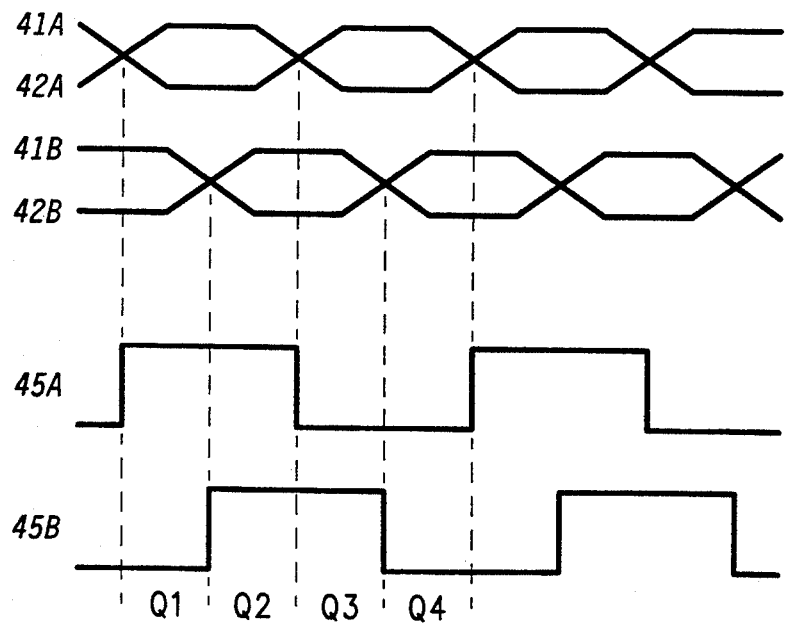
FIG. 5C
FIG. 5D

OPTOELECTRONIC SPEED/DIRECTION DETECTOR

The present invention pertains to optoelectronic movement sensors and more specifically to optoelectronic detectors for sensing speed and direction of a moving apparatus.

BACKGROUND OF THE INVENTION

Optoelectronic sensors are relatively well known in the art and have been utilized in the prior art as shaft encoders and other movement detectors. In at least one prior art optoelectronic movement sensor, a single light detector is utilized in conjunction with a light source opposite a patterned reticle. The major problem with this structure is that the amplitude of the output signals is dependent upon the brightness of the light source.

In another prior art structure, two light detectors are utilized but they are incorporated into a single semiconductor chip and, thus, the light detectors have a fixed relative position. This is a serious problem since in many instances the reticle must be constructed in a certain form or size. By fixedly positioning the light detectors in a single semiconductor chip, the size and spacing of the light detectors is severely limited, which severely limits the size and shape of the reticle and interupter.

In another prior art structure, two light detectors are utilized separately with one or two light sources. The outputs of the two light detectors are applied to operational amplifiers to obtain a linear output signal. This linear signal is utilized in the micrometer and submicrometer range for the adjustment of optical waveguides. While this device is useful for accurately positioning relatively small or precision items, it is not convenient for use in sensing relatively large movements or direction of the movement. This is especially true if the signals are being applied to digital circuitry, such as a microprocessor, since A/D converters or the like must be used and the cost and size becomes prohibitive.

SUMMARY OF THE INVENTION

It is an intention of the present invention to provide a new and improved optoelectronic speed/direction detector.

It is a further intention of the present invention to provide a new and improved optoelectronic speed/direction detector that provides digital signals directly.

These and other objects are realized in a differential optoelectronic speed/direction detector for detecting movement of moveable apparatus including a light source, a moveable reticle positioned adjacent the light source with alternate light opaque and light transparent portions, the reticle being attachable to the moveable apparatus for movement therewith, first and second light sensors positioned adjacent the reticle opposite the light source and spaced apart so that a light opaque portion of the reticle is positioned between the light source and the first light sensor when a light transparent portion of the reticle is positioned between the light source and the second light sensor, the first and second light sensors each providing a signal output at an output terminal, the amplitude of which output signal depends upon the amount of light impinging upon the light sensor producing the output signal, and a comparator having a first signal input terminal connected to the output terminal of the first light sensor and a second signal input terminal connected to the output terminal of the second light sensor, the comparator having a signal output terminal and providing a digital output signal thereon with a constant duty cycle during continuous movement of the moveable apparatus.

BRIEF DESCRIPTION OF THE DRAWINGS

Referring to the drawings:

FIGS. 1A through 1E are a simplified diagram of a prior art sensor and output waveforms therefrom;

FIGS. 5A through 5D illustrate another embodiment of a differential optoelectronic speed/direction detector constructed in accordance with the present invention;

DESCRIPTION OF THE PREFERRED EMBODIMENT

Figure 2A:
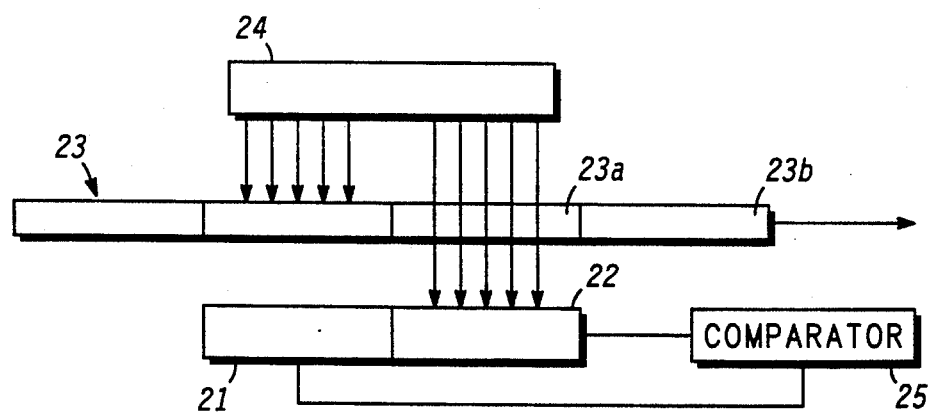
FIGS. 2A through 2D are a simplified diagram of a sensor constructed in accordance with the present invention and output waveforms therefrom.

FIG. 1A illustrates, in simplified block form, a prior art device 10 utilizing a single light detector 11 mounted on one side of a reticle, or code wheel, 13. Reticle 13 has alternating transparent portions 13a and opaque portions 13b. A light source 14 is mounted on the other side of reticle 13 so that when reticle 13 moves a distance d to the right, light detector 11 produces alternating electrical signals. If light source 14 is bright, the output signals from light detector 11 are relatively high in amplitude, as illustrated in FIG. 1B. If light source 14 is dim, the output signals have a relatively low amplitude, as illustrated in FIG. 1D.

This change in amplitude of the output signals with changes in intensity of light source 14 causes a problem when the output signals are converted to digital signals by switching circuits or amplitude limiting. FIGS. 1C and 1E illustrate the result when the signals of FIGS. 1B and 1D are applied to a Schmitt trigger circuit. While the length of a complete cycle ($t_1$ and $t_2$) remains relatively constant, the duty cycle, or the ON time versus the OFF time, changes substantially. This variation in duty cycle of the output signal is very undesirable.

Figure 2B:
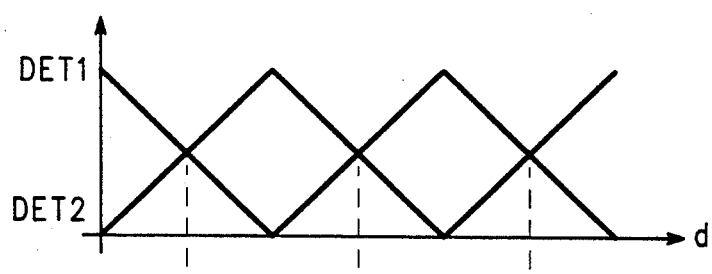
Figure 2C:
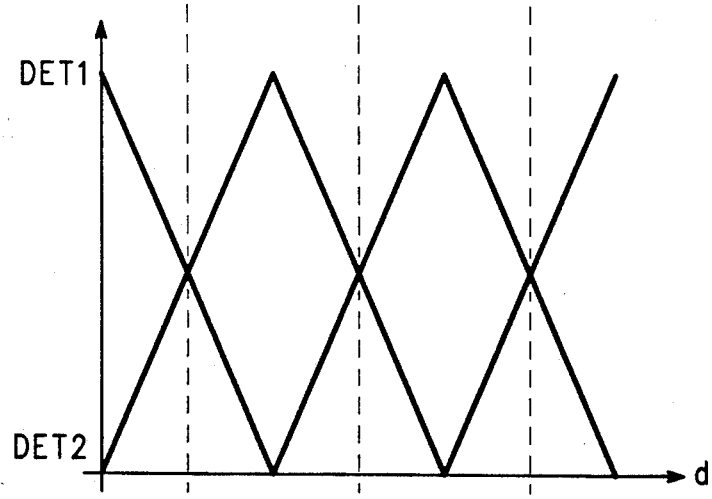

FIG. 2A illustrates, in simplified block form, a differential optoelectronic speed/direction detector 20, constructed in accordance with the present invention. Detector 20 includes two light sensors 21 and 22 mounted on one side of a reticle, or code wheel, 23. Reticle 23 has alternating transparent portions 23a and opaque portions 23b. A light source 24 is mounted on the other side of reticle 23 so that when reticle 23 moves a distance d (see FIG. 2B) to the right, light sensors 21 and 22 each produce alternating electrical signals. If light source 24 is dim, the output signals have a relatively low amplitude, as illustrated in FIG. 2B. If light source 24 is bright, the output signals have a relatively high amplitude, as illustrated in FIG. 2C.

However, in detector 20 the output signals from light sensors 21 and 22 are applied to two inputs of a comparator circuit 25. As can be seen from FIG. 2D, which represents the output signal from comparator 25, a digital output signal is produced by comparator 25 and the duty cycle of the digital output signal remains constant regardless of the intensity of light source 24. This occurs because the position of each cross-over point of the output signals from light sensors 21 and 22 dictates the switching point of a digital pulse and each cross-over point is dependent upon the position of the reticle 23.

Figure 2D:
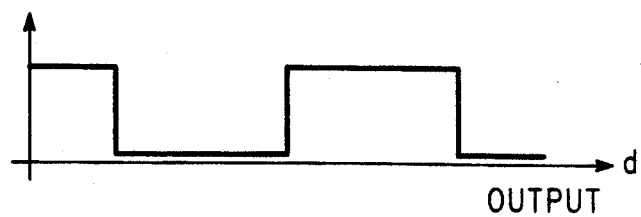
Figure 3:
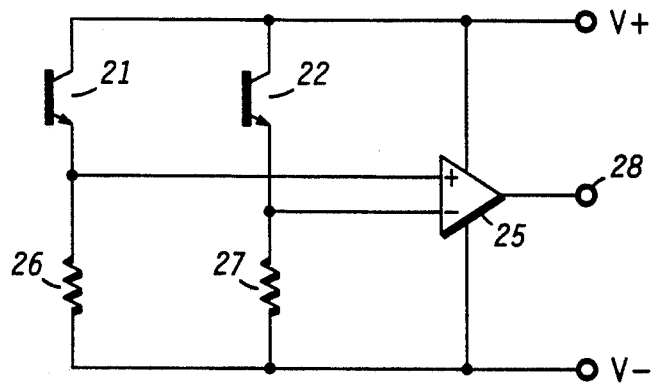
FIG. 3 is a schematic diagram of a differential optoelectronic speed/direction detector constructed in accordance with the present invention.

Referring to FIG. 3, a schematic diagram of the electronic portion of differential optoelectronic speed/direction detector 20 is illustrated. As illustrated, detector 20 includes a pair of light sensing transistors 21 and 22, each having a collector connected to a terminal V+, adapted to have a positive voltage source connected thereto, and an emitter connected through a resistor 26 and 27, respectively, to a terminal V−, adapted to have a reference potential such as ground connected thereto. Resistors 26 and 27 develop a voltage thereacross which is applied directly to positive and negative inputs, respectively, of comparator 25. The output of comparator 25, on terminal 28, is a digital signal as illustrated in FIG. 2D.

Figure 4A:
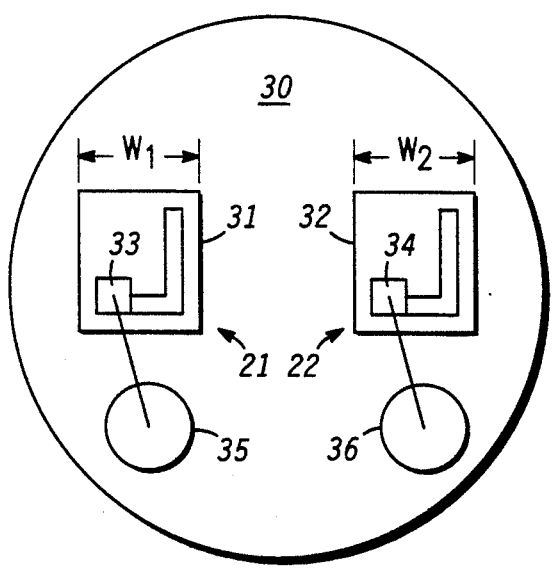
FIGS. 4A and 4B illustrate two positions for the sensors of the structure of FIG. 3.

Transistors 21 and 22 are discrete transistors mounted in a sealed container, such as the can 30 illustrated in FIG. 4 A. Transistors 21 and 22 include the usual P-N junction with light receiving surfaces 31 and 32, respectively. Surfaces 31 and 32 have a width $W_1$ and $W_2$, respectively, which are equal and measured in the direction of movement of the reticle 23 thereacross. Output contacts include metalization patterns 33 and 34 formed on surfaces 31 and 32, respectively, with lead wires connected to external output terminals 35 and 36. Output terminals 35 and 36 are connected to the emitters of transistors 21 and 22, respectively, and a terminal V+ (not shown in FIG. 4A) is provided for the application of a positive voltage. When can 30 is to be used, output terminals 35 and 36 are simply connected to the input terminals of comparator 25 with emitter resistors 26 and 27 connected therefrom, respectively, to reference potential V−.

Supplying transistors 21 and 22 as discrete elements in can 30 has the great advantage that the spacing of transistors 21 and 22 is variable. That is, a customer for a differential optoelectronic speed/direction detector simply notifies the manufacturer of his reticle size/spacing and the manufacturer produces the number of cans 30 required, with the correct spacing to fit the customer's reticle.

Figure 4B:
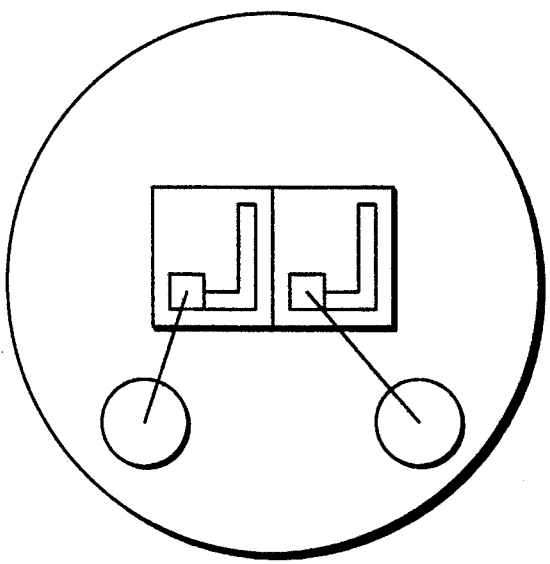

Because the distance $W_1$ or $W_2$ is relatively small (approximately 0.025 inches), the spacing of transistors 21 and 22 is generally such that one transparent portion 23a, or opaque portion 23b, extends approximately from the center of surface 31 (one half $W_1$) to the center of surface 32 (one half of $W_2$). However, it will be understood that the reticle can be formed with transparent and opaque portions that are the same width ($W_1$ or $W_2$) as surfaces 31 and 32. The spacing between transistors 21 and 22 can then be made any integral multiple of $W_1$ or $W_2$, for example in abutting relation as shown in FIG. 4B.

FIGS. 5A through 5D illustrate another embodiment of a differential optoelectronic speed/direction detector 40 constructed in accordance with the present invention. Detector 40 includes four light sensors 41A, 42A, 41B and 42B connected to two comparators 45A and 45B, respectively. A reticle 43 has transparent portions 43a and opaque portions 43b, the width (in the direction of movement) of each being approximately equal to the width of two light sensors, e.g., 41A and 41B, The light sensors are positioned alternately, i.e., 41A, 41B, 42A and 42B, so that each pair of light sensors, 41A-42A and 41B-42B, which are connected to the same comparator are separated by the width of one light sensor.

Light sensors 41A, 41B, 42A and 42B provide output signals represented by the waveforms illustrated in FIG. 5B. Combining these waveforms into pairs, as they are applied to comparators 45A and 45B, results in the waveforms illustrated in FIG. 5C. The output signals from comparators 45A and 45B are represented by the waveforms illustrated in FIG. 5D. The timing and phase relationship between the input signals of FIG. 5C and the output signals of FIG. 5D is illustrated by the broken lines connecting the two FIGS. 5C and 5D. It can be seen that the output signals of comparators 45A and 45B are digital signals which are in quadrature, or separated by a phase angle of ninety degrees. The phase angle of ninety degrees was chosen for this example because of its simplicity of construction and it will of course be understood that virtually any phase angle that can be conveniently constructed and measured can be utilized.

Referring to FIG. 5D, it will be understood that either output signal provides a continuous measurement of the distance that reticle 43 has moved. Further, the output signal can be differentiated to determine the speed of movement and differentiated again to determine the acceleration, if desired. Also, it can be seen that the output signal from comparator 45A leads the output signal from comparator 45B by ninety degrees. In the illustrated example, reticle 43 is moving continuously to the right in FIG. 5A. However, it should be understood that movement of reticle 43 to the left in FIG. 5A will cause the output signal of comparator 45A to lag the output signal of 45B by ninety degrees. Thus, it will be understood that the quadrature output signals of comparators 45A and 45B can be used to determine the direction of movement of reticle 43.

Figure 6:
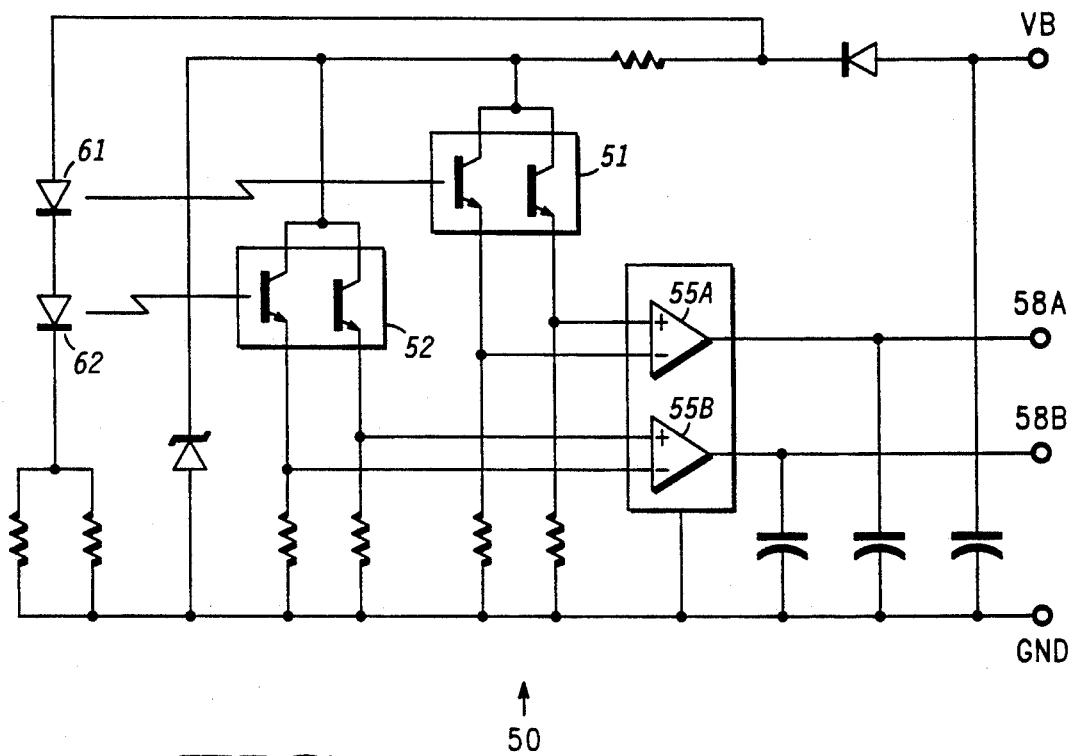
FIG. 6 is a schematic diagram of another embodiment of a differential optoelectronic speed/direction detector constructed in accordance with the present invention.

Referring to FIG. 6, a schematic diagram of a differential optoelectronic speed/direction detector 50 is illustrated. In this embodiment, detector 50 includes two cans 51 and 52, similar to can 30 illustrated in FIG. 4A. The light sensors in cans 51 and 52 are connected to a pair of comparators 55A and 55B, which may be for example comparators sold commercially as MC34072D. The positive voltage terminal of cans 51 and 52 is connected to a positive voltage input terminal VB, along with the positive terminal of comparators 55A and 55B. A pair of light emitting diodes (LEDs) 61 and 62 are also connected to input terminal VB. LEDs 61 and 62 are positioned to emit light onto the light sensors in cans 51 and 52, respectively.

Figure 7:
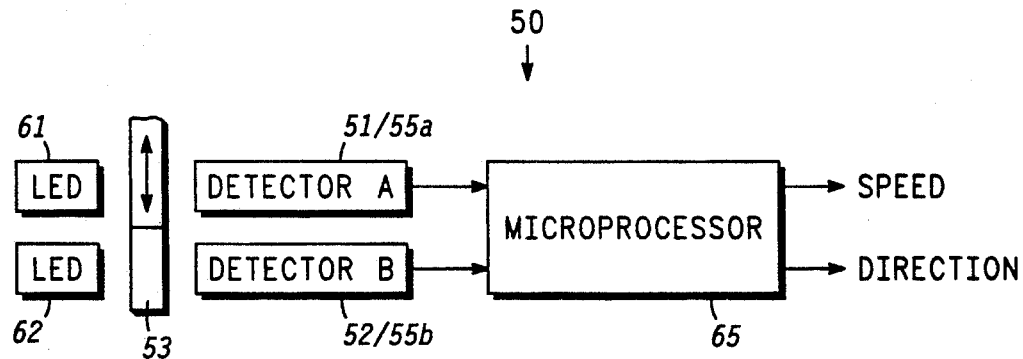
FIG. 7 is a simplified block diagram of a complete speed/direction detecting system including the detector of FIG. 6.

A complete system including detector 50 is illustrated in block diagram in FIG. 7. A reticle 53 is attached to some apparatus for which it is desired to measure the speed and/or direction of movement. LEDs 61 and 62 are positioned on one side of reticle 53 and cans 51 and 52, each containing a pair of light sensors spaced apart one transparent or opaque portion of reticle 43 (FIG. 4A), are positioned on the other side of reticle 43. Cans 51 and 52 are further spaced apart, along reticle 43, so that a phase difference is produced between the output signals therefrom. The output signals from comparators 55A and 55B are connected to two inputs of a microprocessor 65. Microprocessor 65 is then used to calculate speed, direction, distance, acceleration, or any combination of these.

Thus, new and improved differential optoelectronic speed/direction detectors have been disclosed which produce digital output signals having a constant duty cycle. Because the digital output signals have a constant duty cycle they can be used directly in associated digital circuitry without further processing. The detectors include light sensors which are easy to manufacture and which, when constructed, can be provided with variable distances between light sensors to accommodate the reticles of different customers. Also, the light sensor cans are basic building blocks which are utilized individually or in pairs, depending upon the application and the desired output information.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A differential optoelectronic speed/direction detector for detecting movement of moveable apparatus, said detector comprising:
   a light source;
   a moveable reticle positioned adjacent to said light source with alternate light opaque and light transparent portions, said reticle being attachable to the moveable apparatus for linear movement of the light opaque and light transparent portions in between the light source and the light sensors therewith;
   first and second light sensors positioned adjacent said reticle opposite said light source and spaced apart so that a light opaque portion of said reticle is positioned between said light source and said first light sensor when a light transparent portion of said reticle is positioned between said light source and said second light sensor, said first and second light sensors each providing a signal output at an output terminal, the amplitude of which output signal depends upon the amount of light impinging upon the light sensor producing the output signal; and
   a comparator having a first signal input terminal connected to the output terminal of said first light sensor and a second signal input terminal connected to the output terminal of said second light sensor, said comparator having a signal output terminal and providing a digital output signal thereof with a constant duty cycle during continuous movement of the moveable apparatus.

2. A differential optoelectronic speed/direction detector as calimed in claim 1 wherein the first and second signal input terminals of the comparator are connected directly to the output terminals of the first and second light sensors, respectively.

3. A differential optoelectronic speed/direction detector as claimed in claim 1 wherein the first and second light sensors each include a light receiving surface and the surfaces are equal in area, which area is a predetermined width in the direction of movement of the reticle.

4. A differential optoelectronic speed/direction detector for detecting movement of moveable apparatus, said detector comprising:
   a light source;
   a moveable reticle positioned adjacent to said light source with alternate light opaque and light transparent portions, said reticle being attachable to the moveable apparatus for movement therewith;
   first and second light sensors positioned adjacent said reticle opposite said light source and spaced apart so that a light opaque portion of said reticle is positioned between said light source and said first light sensor when a light transparent portion of said reticle is positioned between said light source and said second light sensor, said first and second light sensors each providing a signal output at an output erminal, the amplitude of which output signal depends upon the amount of light impinging upon the light sensor producing the output signal;
   wherein the first and second light sensors are discrete sensors included in a single sealed container and were prepositioned to match the light transparent and light opaque portions of the reticle; and
   a comparator having a first signal input terminal connected to the output terminal of said first light sensor and a second signal input terminal connected to the output terminal of said second light sensor, said comparator having a signal output terminal and providing a digital output signal thereon with a constant duty cycle during continuous movement of the moveable apparatus.

5. A differential optoelectronic speed/direction detector for detecting movement of moveable apparatus, said detector comprising:
   a light source;
   a moveable reticle positioned adjacent to said light source with alternate light opaque and light transparent portions, said reticle being attachable to the moveable apparatus for movement therewith;
   first and second light sensors positioned adjacent said reticle opposite said light source and spaced apart so that a light opaque portion of said reticle is positioned between said light source and said first light sensor when a light transparent portion of said reticle is positioned between said light source and said second light sensor, said first and second light sensors each providing a signal output at an output terminal, the amplitude of which output signal depends upon the amount of light impinging upon the light sensor producing the output signal, the first and second light sensors each include a light receiving surface and the surfaces are qual in area, which area is a predetermined width in the direction of movement of the reticle;
   wherein the alternate light opaque and light transparent portions of the moveable reticle are each formed as substantially an integral multiple of the predetermined width of the light sensors; and
   a comparator having a first signal input terminal connected to the output terminal of said first light sensor and a second signal input terminal connected to the output terminal of said second light sensor, said comparator having a signal output terminal and providing a digital output signal thereon with a constant duty cycle during continuous movement of the moveable apparatus.

6. A differential optoelectronic speed/direction detector for detecting movement of moveable apparatus comprising:
   a first light source;

a moveable reticle positioned adjacent said first light source with alternate light opaque and light transparent portions, said reticle being attachable to the moveable apparatus for movement therewith;

first and second light sensors positioned adjacent said reticle opposite said first lightsource and spaced apart so that a light opaque portion of said reticle is positioned between said first light source and said first light sensor when a light transparent portion of said reticle is positioned between said first source and said second light sensor, said first and second light sensors each providing a signal output at an output terminal, the amplitude of which output signal depends upon the amount of light impinging upon the light sensor producing the output signal;

a first comparator having a positive signal input terminal connected to the output terminal of said first light sensor and a negative signal input terminal connected to the output terminal of said second light sensor, said first comparator having a signal output terminal and providing a digital output signal thereon with a constant duty cycle with continuous movement of the moveable apparatus;

a second light source;

third and fourth light sensors positioned adjacent said reticle opposite said second light source and spaced apart so that a light opaque portion of said reticle is positioned between said second light source and said third light sensor when a light transparent portion of said reticle is positioned between said second light source and said fourth light sensor, said third and fourth light sensors each providing a signal output at an output terminal, the amplitude of which output signal depends upon the amount of light impinging upon the light sensor producing the output signal;

a second comparator having a positive signal input terminal connected to the output terminal of said third light sensor and a negative signal input terminal connected to the output terminal of said fourth light sensor, said second comparator having a signal output terminal and providing a digital output signal thereof with a constant duty cycle during continuous movement of the moveable apparatus; and said first and second comparators providing digital output signals on respective output terminals which digital output signals are approximately in quadrature.

7. A differential optoelectronic speed/direction detector as claimed in claim 6 wherein each of the four light sensors include a light receiving surface and the surfaces are equal in area, which area is a predetermined width that the direction of movement of the reticle, and each of the light transparent and light opaque portions of the reticle has a width in the direction of movement equal to approximately an integral multiple of the predetermined width of the light sensors.

8. A differential optoelectronic speed/direction detector as claimed in claim 7 wherein the first, second, third and fourth light sensors are all included in a single sealed container and are positioned adjacent each other in the direction of movement of the reticle with the order being first, third, second and fourth light sensors.

9. A differential optoelectronic speed/direction detector as claimed in claim 7 wherein the positive and negative signal input terminals of the first and second comparators are connected directly to the output terminals of the first, second, third and fourth light sensors, respectively.

10. A method of producing a differential optoelectronic speed/direction detector for sensing extended movement of a reticle with alternate and equal sized light opaque and light transparent portions, the reticle being attached to and moveable with apparatus designed to move in a back and forth direction, the method comprising the steps of:

providing a light source on one side of said reticle;

providing first and second discrete light sensors each including a light receiving surface and the surfaces are equal in area, which area is a predetermined width in the direction of movement of the reticle;

positioning said first and second discrete light sensors adjacent said reticle and opposite said light source, further positioning said first and second discrete light sensors in a spaced apart relationship so that a light opaque or light transparent portion of said reticle extends approximately from the center of the predetermined width of the first discrete light sensor to the center of the predetermined width of the second discrete light sensor, said first and second light sensors each providing a signal output at an output terminal, the amplitude of which output signal depends upon the amount of light impinging upon the light sensor producing the output signal;

providing a comparator having a first signal input terminal, a second signal input terminal and a signal output terminal; and electrically connecting the first signal input terminal to the output terminal of the first light sensor and the second signal input terminal to the output terminal of the second light sensor so that digital output signal with a constant duty cycle is produced at the output terminal of the comparator during continuous movement of the moveable reticle.

11. A method of producing a differential optoelectronic speed/direction detector as claimed in claim 10 further including the step of utilizing the digital output signal in an electronic circuit to calculate the speed of movement of the reticle and the attached apparatus.

12. A method of producing a differential optoelectronic speed/direction detector as claimed in claim 10 including in addition the steps of:

providing a light source on one side of said reticle;

providing first and second discrete light sensors each including a light receiving surface and the surfaces are equal in area, which area is a predetermined width in the direction of movement of the reticle;

positioning said third and fourth light sensors adjacent said reticle and opposite said second light source, further positioning said third and fourth light sensors in a spaced apart relationship so that a light opaque or light transparent portion of said reticle extends approximately from the center of the predetermined width of the third light sensor to the center of the predetermined width of the fourth light sensor, said third and fourth light sensors each providing a signal output at an output terminal, the amplitude of which output signal depends upon the amount of light impinging upon the light sensor producing the output signal;

the third and fourth light sensors being further positioned, relative to the reticle, so that the output signals from the third and fourth light sensors are out of phase with the output signals from the first and second light sensors;

providing a second comparator having a first signal input terminal, a second signal input terminal and a signal output terminal;

electrically connecting the first signal input terminal of the second comparator to the output terminal of the third light sensor and the second signal input terminal of the second comparator to the output terminal of the fourth light sensor so that a second digital output signal with a constant duty cycle is produced at the output terminal of the second comparator during continuous movement of the movable reticle, the second digital output signal being out of phase with the digital output signal; and utilizing the out of phase digital output signals from the phase comparators in an electronic circuit to calculate the speed and direction of movement of the reticle and the attached apparatus.

13. A method of producing a differential optoelectronic speed/direction detector as claimed in claim 11 wherein the third and fourth light sensors are positioned so that the comparator output signals are approximately ninety degrees out of phase, or in phase quadrature.

* * * * *